United States Patent [19]

Nelms

[11] Patent Number: 5,240,278
[45] Date of Patent: Aug. 31, 1993

[54] VEHICLE SUSPENSION

[76] Inventor: Charan Nelms, 41 Francis Little Drive, Abingdon, Oxford OX14 5PN, England

[21] Appl. No.: 683,462

[22] Filed: Apr. 11, 1991

[30] Foreign Application Priority Data

Apr. 12, 1990 [GB] United Kingdom ............... 9008463

[51] Int. Cl.$^5$ ............................................. B60G 5/00
[52] U.S. Cl. .................................... 280/668; 280/692
[58] Field of Search ............. 280/688, 701, 724, 666, 280/662, 668, 623, 670, 672, 692, 697, 712

[56] References Cited

U.S. PATENT DOCUMENTS 2,703,708  3/1955  Wagner ............................. 280/692
5,048,858  9/1991  Lugar ................................. 280/668

FOREIGN PATENT DOCUMENTS 2009682  6/1979  United Kingdom ............... 280/668

Primary Examiner—Robert P. Olszewski
Assistant Examiner—Kenneth Noland
Attorney, Agent, or Firm—Davis, Bujold & Streck

[57] ABSTRACT

A known vehicle front wheel suspension incorporates a cross-member of sheet material adapted to support a wheel suspension assembly at each end of the cross member. Each assembly comprises a lever arm shock absorber mounted on an upper location on an end of the cross-member having a damped lever arm serving as an upper arm for the wheel suspension; the inner end of the damped lever arm being adapted to rotate about a first axis of fixed alignment relative to the cross member; a lower arm pivotably attached at its inner end to a lower location on an end of the cross-member so as to rotate about a second axis of fixed alignment relative to the cross member; a wheel carrier pivotably located by and between- the outer end of the upper arm for rotation about a third axis, and the outer end of the lower arm for rotation about a fourth axis; the first, second, third and fourth axis all being parallel to one another; and a coil spring acting between the lower arm and the cross member. The present also relates to a method of modifying a suspension system.

2 Claims, 2 Drawing Sheets

VEHICLE SUSPENSION

This invention relates to a vehicle suspension.

Older designs of vehicle suspensions make use of lever arm shock absorbers rather than those of the telescopic type which are now far more extensively developed, distributed and used. Consequently when a vehicle suspension originally equipped with a lever arm shock absorber requires replacement of the shock absorber (also known as a damper with reference to its action on a spring with which it is associated in the suspension) there is a need to either obtain a replacement lever arm unit or remove and renovate the existing one. Replacement is likely to be an expensive matter even if replacement units are still available. Even if they are it is unlikely that a range of differently rated lever units are available to allow selection to be made of units for different types of competition or for standard road use. In addition ready adjustment of things like ride height is not readily undertaken with known types of lever unit suspensions.

A vehicle front wheel suspension is known wherein a cross-member of sheet material is adapted to support a wheel suspension assembly at each end of the cross member. Each wheel suspension assembly comprises:

a lever arm shock absorber mounted on an upper location on an end of the cross-member having a damped lever arm serving as an upper arm for the wheel suspension; the inner end of the damped lever arm being adapted to rotate about a first axis of fixed alignment relative to the cross member;

a lower arm pivotably attached at its inner end to a lower location on an end of the cross-member so as to rotate about a second axis of fixed alignment relative to the cross member;

a wheel carrier pivotably located by and between- the outer end of the upper arm for rotation about a third axis, and the outer end of the lower arm for rotation about a fourth axis;

the first, second, third and fourth axis all being parallel to one another;

and a coil spring acting between the lower arm and the cross member.

Hereafter such a front wheel suspension will be referred to as being of the 'type described'.

According to a first aspect of the present invention there is provided a method of modifying a suspension of the type described comprising the steps of:

1) removing the lever arm shock absorber and replacing it by an upper lever arm so that its inner end is pivotably mounted on the cross member for rotation about the first axis previously associated with the lever arm of the previous lever arm shock absorber, and so that its outer end is pivotably mounted on the wheel carrier for rotation about the third axis previously associated with the lever arm of the previous lever arm shock absorber;

2) generating an hole in the cross member to provide a clearance line of sight aperture between aligned portions of the first and second axes;

3) locating within the coil spring a telescopic shock absorber so that the one end of the shock absorber is anchored on the lower arm or an extension thereof at a point intermediate the third and fourth axis; and 4) locating the other end of the shock absorber on the upper arm, or an extension thereof, so that the other end is pivotable about the first axis and the shock absorber extends through the clearance aperture.

According to a second aspect of the present invention there is provided a vehicle having a front suspension mounted on a cross member and characterised by:

1) a carrier for a ground engaging wheel, the carrier being attached for vertical motion relative to the cross member by
   i) an upper arm having an inner end pivotably attached to the cross member for rotation about a first axis; and an outer end pivotably attached to the wheel carrier for rotation about a third axis;
   ii) a lower arm having an inner end pivotably attached to the cross member for rotation about a second axis; and an outer end pivotably attached to the wheel carrier for rotation about a fourth axis;

2) a coil spring extending between the cross member and the lower arm the spring being disposed with its longitudinal axis passing through the first axis and a point on a lower arm plane common to the second and fourth axis and intermediate the second and fourth axis; and 3) a telescopic shock absorber extending between the cross member and the lower arm, the shock absorber being disposed within the coil spring coaxially with the longitudinal axis and pivotably mounted at its upper end for rotation about the first axis and pivotably mounted at its lower end for rotation about a fifth axis parallel to the second an fourth axis and lying below the lower arm plane.

An exemplary embodiment of the invention will now be described with reference to the accompanying drawings of which:

FIGURE 1

Figure 1:
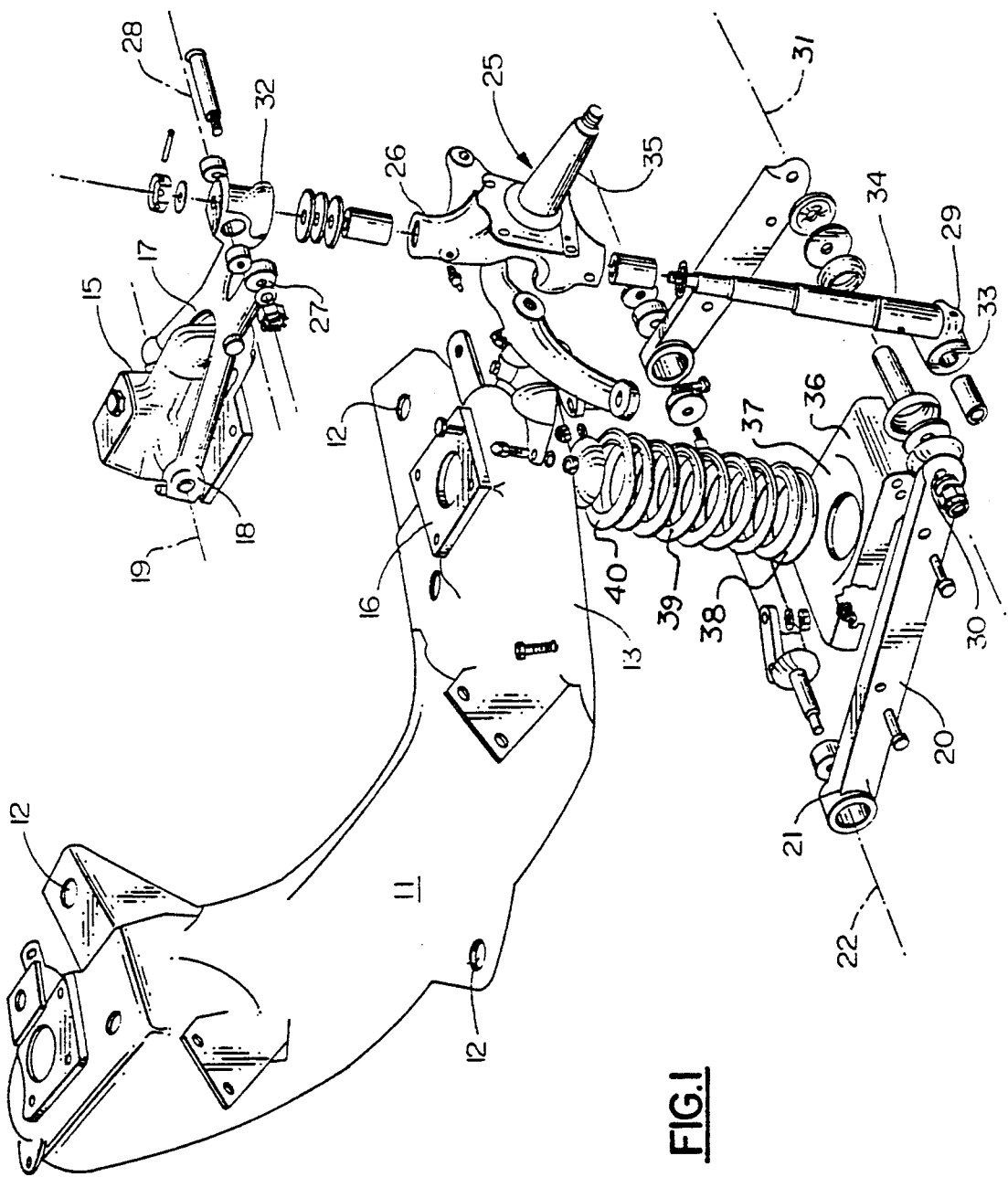
FIG. 1 is an exploded perspective view of components making up a front wheel vehicle suspension of the type described.

This shows a pressed steel cross member 11 for the front suspension of an MG (RTM) sports car known by the model name of MGB. The cross member 11 is located on the monocoque body of the car by way of four holes 12.

At either end of the cross member 11 there is provided a wheel suspension assembly. Since comparable components of the assemblies are substantially identical, or mirror images, of each other in form and identical in function only those relating to end 13 are shown.

A lever arm shock absorber 15 is mounted on an upper flat section 16 of the cross-member 11 and provides a damped A-bracket arm serving as an upper arm 17 for the wheel suspension as will be described hereafter. The damped arm 17 has an inner end 18 adapted to rotate about a first axis 19 of fixed alignment relative to the cross member 11.

A further A-bracket serves as a lower arm 20 being pivotably attached at its inner end 21 to a further location on the cross member 11 and is adapted for rotation about a second axis 22 parallel to first axis 19 and of fixed alignment relative to the cross-member 11.

An axle assembly 25 is pivotably located at its upper end 26 by outer end 27 of the upper arm 17 about a third axis 28 which moves relative to the first axis 19 vertically on a radius represented by the length of the upper arm 17 between axis 19 and axis 28.

The assembly 25 is pivotably located at its lower end 29 by outer end 30 of the lower arm 20 about a fourth axis 31 which moves relative to the second axis 22 vertically on a radius represented by the length of the lower arm 20 between axis 22 and axis 31.

The axle assembly 25 includes a pin swivel 34 and a stub axle unit 35.

The first axis 19, second axis 22, third axis 28 and fourth axis 31 are all parallel to one another.

The lower arm 20 has a tray 36 which has a recess 37 serving to locate lower end 38 of a coil spring 39. The recess 37 lies between the second axis 22 and fourth axis 31.

Upper end 40 of spring 39 is located beneath section 16 of cross-member 11.

It will be seen that the spring 39 acts between the cross member 11 and, by way of lower arm 20, on the lower end of the axle assembly 25 whereas the lever damper 15 acts by way of upper arm 17 on the upper end of the axle assembly 25.

The use of a lever arm damper 15 while envisaged in the original version of the vehicle suspension means that the benefits of a modern telescopic damper unit cannot be obtained in the vehicle suspension. The present invention provides for the installation of a telescopic damper without much difficulty while enabling many original suspension components to be retained.

FIGURE 2

Figure 2:
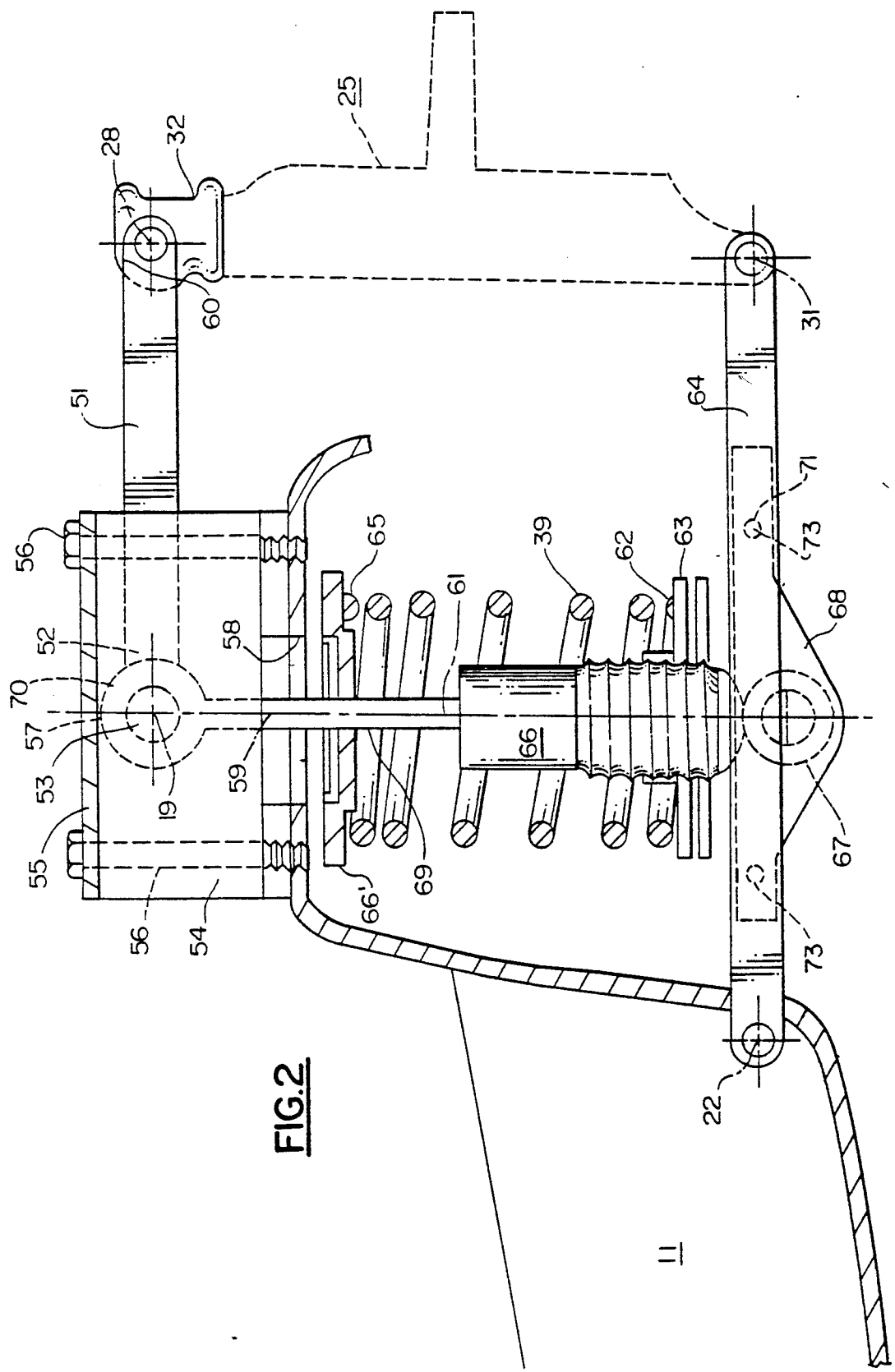
FIG. 2 is front elevation of a suspension similar to that shown in FIG. 1 but modified in accordance with the present invention.

This shows a suspension based on that shown in FIG. 1 but with a number of modifications. Components having a similar form and function in FIGS. 1 and 2 are given the same reference numeral.

Cross member 11 serves to locate first axis 19, second axis 22, third axis 28 and fourth axis 31.

The lever arm shock absorber 15 (shown in FIG. 1) has been removed and replaced by an A-frame upper arm 51 with inner end 52 mounted on pivot 53 for rotation about first axis 19 on blocks 54 bolted to the cross member 11. The blocks 54 are bridged by a flat plate 55 which are through bolted to the cross member 11 by way of bolts 56. The plate 55 has a locating hole 57 at its centre. This enables the plate 55 before being bolted in place to serve as a locating means for the boring of an aperture 58 with centre 59 through the cross member.

Outer end 60 of the upper arm 51 is pivotably coupled to trunnion 32 so serving to constrain movement of the upper end of the axle assembly 25.

The centre 59 lies on an axis 61 about which is disposed coil spring 39. Lower end 62 of the spring 39 is seated on a flange 63 on the bottom of the shock absorber 66 to enable the length of the spring to be varied relative to the shock absorber 66.

A telescopic shock absorber 66 is located within the coil spring 39 substantially co-axial with the axis 61.

Upper end 65 of the coil spring 39 seats on the underside of a flange 66″ mounted on upper stem 69 of the shock absorber 66 allowing for the operating length of the spring to be adjusted relative to the shock absorber. Lower ring 67 of the shock absorber 66 is pivotably anchored to a trunnion 68 extending downwardly from a tray 71 extending between the arms of the A frame.

Upper ring 70 of the shock absorber 66 is pivotably mounted on the pivot 53 so that it is located on the first axis 19 and consequently does not result in a bending moment being applied to the upper arm 51. In a known manner the shock absorber 66 forms a unit with the spring 39 between the cross member 11 and the lower arm 64.

The conversion from the use of a lever arm shock absorber 15 (shown in FIG. 1) to that making use of a telescopic absorber 66 (shown in FIG. 2) can be carried out without removing the cross member 11 from the vehicle.

Referring firstly to FIG. 1 the front of the vehicle is raised and the front wheels removed. The lower arm 20 is removed together with the spring 39 and the lever arm shock absorber 15.

Referring now to FIG. 2 the plate 55 is positioned by hand on the underside of the region 16 on the cross member 11 and aligned so that the holes in the plate line up with the existing holes in the cross member which formerly served to locate the lever arm shock absorber 15. With plate 55 aligned in this way the hole 57 serves to accurately locate the position for a pilot drill of a circular saw thereafter used to cut aperture 58 in the cross member 11. Once this aperture 58 has been drilled blocks 54 are mounted on the upper side of the cross member 11, and topped by plate 55. Bolts 56 are then used to through bolt plate 55 and blocks 54 to the cross member 11.

Upper arm 51 is then mounted at its inner end between the blocks 54 by way of pivot pin 53 which also serves to pivotably locate upper end 69 of shock absorber 66. The combined shock absorber 66 and coil spring 39 are then positioned with their common longitudinal axis 61 located as shown.

Lower are 64 is then pivotably mounted on cross member 11 for rotation about second axis 22. The lower end 67 of the shock absorber 66 is located pivot 72. The tray 63 is then secured in place by bolts 73 on the lower arm using existing holes in the arm previously occupied by the tray shown in FIG. 1 locating the bottom of the spring. This earlier tray is replaced by the new tray 63.

The axle assembly 25 is then secured in an identical manner as shown in FIG. 1 to the outer ends of the upper arm 51 and lower arm 20 and the vehicle thereafter restored to use.

It will be seen that the telescopic shock absorber 15 when mounted on axis 61 is enabled to be of the greatest possible practical length with the lower end 66 mounted on a trunnion 68 which extends beneath the tray 63 without adversely effecting useful ground clearance. It will also be apparent that the upper arm 51 can be of lighter construction than was the case when the upper arm was formed by the lever arm of the shock absorber. Typically the bending moments arising in the upper arm during use with the telescopic shock absorber are now reduced as against those arising in the original lever arm arrangement.

Conversion work is similarly undertaken on the opposite side of the vehicle.

The conversion provides for the use of an adjustable rate, gas filled damper with provision for ride height adjustment. The damper, and for that matter its related spring, are relatively easily replaced for general use or competition purposes.

I claim:

1. A vehicle having a front suspension mounted on a cross member and characterised by:
 1) a carrier for a ground engaging wheel, the carrier being attached for vertical motion relative to the cross member by
   i) an upper arm having an inner end pivotably attached to the cross member for rotation about a first axis; and an outer end pivotably attached to the wheel carrier for rotation about a third axis;
ii) a lower arm having an inner end pivotably attached to the cross member for rotation about a second axis; and an outer end pivotably attached to the wheel carrier for rotation about a fourth axis;
2) a coil spring extending between the cross member and the lower arm the spring being disposed with its longitudinal axis passing through the first axis and a point on a lower arm plane common to the second and fourth axis and intermediate the second and fourth axis; and
3) a telescopic shock absorber extending between the cross member and the lower arm, the shock absorber being disposed within the coil spring coaxially with the longitudinal axis and pivotably mounted at its upper end for rotation about the first axis and pivotably mounted at its lower end for rotation about a fifth axis parallel to the second an fourth axis and lying below the lower arm plane.

2. A method of modifying a vehicle suspension having a cross member and a carrier for a ground engaging wheel attached for vertical motion relative to the cross member by:
i) a lever arm shock absorber having an inner end pivotably attached to the cross member for rotation about a first axis, and an outer end pivotably attached to the wheel carrier for rotation about a third axis;
ii) a lower arm having an inner end pivotably attached to the cross member for rotation about a second axis, and an outer end pivotably attached to the wheel carrier for rotation about a fourth axis; and
a coil spring extending between the cross member and the lower arm;
said method comprising the steps of:
a) removing the lever arm shock absorber and replacing it by an upper lever arm so that its inner end is pivotably mounted on the cross member for rotation about the first axis previously associated with the lever arm of the previous lever arm shock absorber, and so that its outer end is pivotably mounted on the wheel carrier for rotation about the third axis previously associated with the lever arm of the previous lever arm shock absorber;
b) generating a hole in the cross member to provide a clearance line of sight aperture between aligned portions of the first and second axes;
c) locating within the coil spring a telescopic shock absorber so that the one end of the shock absorber is anchored on one of the lower arm and an extension thereof at a point intermediate the third and fourth axis; and
d) locating the other end of the shock absorber on one of the upper arm and an extension thereof so that the other end is pivotable about the first axis and the shock absorber extends through the clearance aperture.

* * * * *